United States Patent
Doolittle et al.

(10) Patent No.: US 8,677,684 B1
(45) Date of Patent: Mar. 25, 2014

(54) TREE INJECTION PLUG

(71) Applicants: Glayne Doolittle, Omaha, NE (US);
Michael J. Frisina, Omaha, NE (US)

(72) Inventors: Glayne Doolittle, Omaha, NE (US);
Michael J. Frisina, Omaha, NE (US)

( * ) Notice: Subject to any disclaimer, the term of this patent is extended or adjusted under 35 U.S.C. 154(b) by 0 days.

(21) Appl. No.: 13/929,064

(22) Filed: Jun. 27, 2013

Related U.S. Application Data (63) Continuation-in-part of application No. 13/136,906, filed on Aug. 15, 2011.

(51) Int. Cl.
*A01G 1/00* (2006.01)

(52) U.S. Cl.
USPC .......................................... 47/57.5

(58) Field of Classification Search
USPC .......................................... 47/57.5
See application file for complete search history.

(56) References Cited

U.S. PATENT DOCUMENTS

| | | | |
|---|---|---|---|
| 2,116,591 A | 11/1937 | Barber | |
| 3,304,655 A | 2/1967 | Mauget | |
| 3,608,239 A | 9/1971 | Tucker | |
| 4,724,793 A * | 2/1988 | Sletten | 118/35 |
| 5,046,281 A | 9/1991 | Murphy | |
| 5,239,773 A | 8/1993 | Doolittle, Jr. | |
| 5,797,215 A * | 8/1998 | Doolittle et al. | 47/57.5 |
| 6,311,429 B1 * | 11/2001 | Wolfe | 47/57.5 |
| 7,178,286 B1 | 2/2007 | Doolittle | |
| 2013/0042526 A1 * | 2/2013 | Doolittle | 47/57.5 |

FOREIGN PATENT DOCUMENTS

| WO | WO 2012114197 A2 * | 8/2012 | A01G 7/06 |

* cited by examiner

*Primary Examiner* — Frank T Palo
(74) *Attorney, Agent, or Firm* — Dennis L. Thomte; Thomte Patent Law Office LLC (57) ABSTRACT

An injector plug for use with an injector for injecting liquid chemical into a tree. After the tree has been injected, the plug remains in the tree.

9 Claims, 6 Drawing Sheets

TREE INJECTION PLUG

CROSS REFERENCE TO RELATED APPLICATION

This is a Continuation-In-Part of application Ser. No. 13/136,906, filed Aug. 15, 2011, entitled AN INJECTION TIP FOR USE WITH AN INJECTOR FOR INJECTING LIQUID CHEMICAL INTO A TREE.

BACKGROUND OF THE INVENTION

1. Field of the Invention

This invention relates to a tree injection plug and more particularly to a tree injection plug which is attachable to a chemical injector and which is inserted into a hole with was previously formed or drilled in the tree. Even more particularly, this invention relates to a tree injection plug which may be left in the tree if so desired.

2. Description of the Related Art

Tree injection is the operation of making a cut in a tree and then placing a dose of liquid chemical into the cut. There are several known methods by which this operation may be done. Generally, a cut is made manually by means of an ax or other such hand tool. The cut must be of such a shape and angle as to allow the introduced chemical to remain in the cut while the tree absorbs and transports the chemical throughout the tree. To efficiently accomplish this operation, the cut must be of sufficient size to accommodate the chemical injector. This often results in damage being done to the tree itself, which is acceptable if the goal is to eventually kill the tree, but completely unacceptable if the goal is to improve the health of the tree.

Furthermore, many of the prior art methods of tree injection involve a two-step operation which can be time consuming and involve considerable manual effort. Also, as the operation involves two steps, there is a delay between making the cut into the tree and introducing the chemical to the cut, which is critical as trees have the ability to quickly heal up incisions protecting them from entry of bacteria or other such harmful organisms.

An example of the prior art which attempts to address these problems is Murphy, U.S. Pat. No. 5,046,281, which discloses an attachment for a handgun with a moveable piston to which is attached a blade to form a cut in a tree, and a fluid injection means which instantaneously supplies a fluid dosage to the cut. The fuel to operate the handgun, together with the fluid to be applied to the cut, are preferably provided in a backpack. While this invention applies liquid instantaneously when the cut is formed, the problem is that the cut is formed by a blade being thrust into the tree thus opening a large hole and causing damage to the surrounding tree tissue. Furthermore, to operate the apparatus, an operator must carry a backpack which holds the fuel and fluid to be injected. This situation does not present a problem when an operator is injecting one tree a day, but on such places as tree farms, an operator may inject hundreds or thousands of trees in a day, involving considerable walking and bending. Carrying such a backpack can result in various degrees of back and leg strain, due to the additional weight thereof. There is therefore a need for a relatively lightweight tree injection apparatus which can inject trees while causing a minimum of damage to the tree tissue.

Other examples of the prior art have used other means of injecting plants, such as needles or the like. Examples of such art are found in Mauget, U.S. Pat. No. 3,304,655, and Barber, U.S. Pat. No. 2,116,591; both disclose injection systems having a needle. However, the problem encountered in utilizing both examples of the prior art is that before the needle may be inserted into a tree, a hole must be formed in the tree, or the needle will be plugged by tree fiber when it is inserted. Generally, at least a ⅛-inch hole needs to be drilled in the tree to insert the needles of the above inventions, which causes a great deal of damage to a tree, which is not a good way to save a tree. Moreover, both of these examples require a two-step operation to achieve injection of a tree.

One other example of the prior art which addresses this problem is Tucker, U.S. Pat. No. 3,608,239, which discloses a tree killing poison injector nozzle comprising a tube having a wedge-shaped end portion for entering a cut formed in a tree. The opposing sides of the wedge-shaped end are cut away to define an opening at each of its sides. A poison directing guard, surrounding the tube, forms laterally open channels lying in the plane of the wedge-shaped end. Once again, however, such an injection system is fine for use if the goal is to kill the tree. If the goal is to improve the health of the tree, however, use of the Tucker invention surely will not achieve the desired end. Furthermore, the cut formed by use of the Tucker device is much larger than is desirable to prevent harm to the tree. Finally, fluid is released from nozzles a substantial distance behind the tree cutting edge, thus resulting in a deeper cut having to be made, causing more damage to the tree.

Applicant's earlier patent, U.S. Pat. No. 5,239,773, solved many of the problems associated with the prior art tree injection systems. Applicant's invention of the co-pending application further advanced the art in the injection systems. See also the co-pending application of Applicant, Ser. No. 13/835, 573 filed Mar. 15, 2013 entitled AN INJECTION TIP FOR USE WITH AN INJECTOR FOR INJECTING LIQUID CHEMICAL INTO A TREE, which further advanced the art of tree injection. In both of the co-pending applications, an injection tip is driven into the trunk of the tree. It has been found that in some situations, it is necessary to drill or create a hole in the trunk of the tree. In that situation, the injection tips are unnecessary but it is still necessary to be able to inject liquid chemical into the hole in the trunk of the tree and provide a means for preventing the liquid chemical from leaking or flowing from the hole after the liquid chemical has been injected into the hole.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An injection plug is disclosed for use with an injector for injecting liquid chemical into a tree. The injection plug includes an elongated body portion having rearward and forward ends. The body portion has a fluid passageway, having first and second ends, which extends between the rearward and forward ends of the body portion. An elongated, spring-loaded valve core, having rearward and forward ends, is positioned in the rearward end of the fluid passageway. The valve core includes a valve which is movable between a normally closed position and an open position. The valve, when in the closed position, prevents the passage of fluid through the fluid passageway. The valve, when in the open position, permits the passage of fluid through the fluid passageway. The valve is moved from its normally closed position to its open position by the fluid pressure of the liquid chemical being discharged by the injector. The valve core also includes an elongated, selectively movable valve actuator having rearward and forward ends. The forward end of the valve actuator is connected to the valve with the rearward end of the valve actuator being positioned rearwardly of the rearward end of the body portion. The body portion has a male coupler structure provided thereon adjacent the rearward end thereof which is configured to be coupled to a female coupler structure on an injector apparatus. The valve could also be moved from its normally closed position to its open position by the female coupler structure when the injector plug is attached to the injector. At least one annular barb, and preferably a plurality of annular barbs, is provided on the body portion adjacent the forward end of the body portion for engagement with the trunk of the tree when the forward end of the body portion is inserted into a hole formed in the tree trunk. The method of using the injector plug is also disclosed.

The method of injecting liquid chemical into the trunk of the tree comprises the steps of:

(1) drilling or forming a hole in the trunk of the tree;

(2) providing a chemical injector, which is in fluid communication with a source of liquid chemical, and which has a female coupler thereon with the female coupler being in fluid communication with the source of liquid chemical;

(3) providing a tree injection plug having an elongated body portion with rearward and forward ends, an elongated central fluid passageway extending between the rearward and forward ends of the body portion, a male coupler structure at the rearward end of the body portion for selective coupling to the female coupler, at least one annular barb adjacent the forward end of the body member, a spring-loaded valve core including a valve, which is movable between open and closed positions, positioned in the rearward end of the central fluid passageway and which has a valve actuator, having forward and rearward ends, connected to the valve with the rearward end of the valve actuator protruding rearwardly from the rearward end of the body portion;

(4) coupling the female coupler onto the male coupler structure on the body portion;

(5) pushing the forward end of the injection plug into the hole in the tree;

(6) operating the chemical injector to force liquid chemical through the injection plug into the tree; and (7) disconnecting the female coupler from the male coupler structure on the body portion of the injection plug so that the injection plug remains in the hole and seals the same to prevent the liquid chemical from escaping from the hole.

It is therefore an object of the present invention to provide an improved tree injection plug.

A further object of the present invention is to provide an improved tree injection plug, which when inserted into a hole formed in a tree, permits the passage of liquid chemical therethrough from an injector.

A further object of the invention is to provide an improved tree injection plug which positively seals a hole formed in the tree trunk to prevent liquid chemicals from escaping therefrom.

A further object of the invention is to provide a tree injection plug which includes a movable valve which permits liquid chemicals to pass therethrough into a tree but which prevents the liquid chemicals from escaping from the tree.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
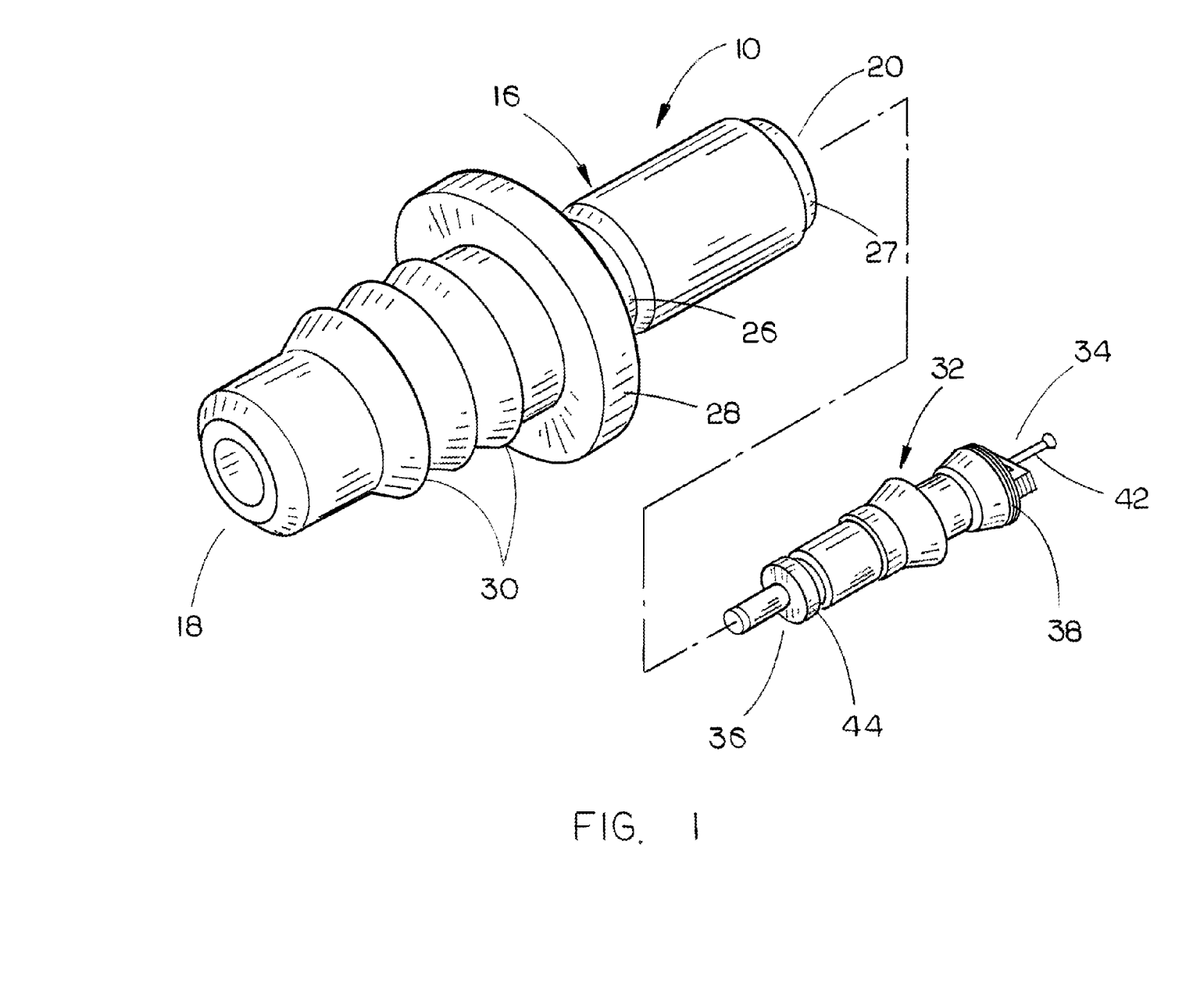
FIG. 1 is an exploded perspective view of the tree injection plug of this invention.
Figure 2A:
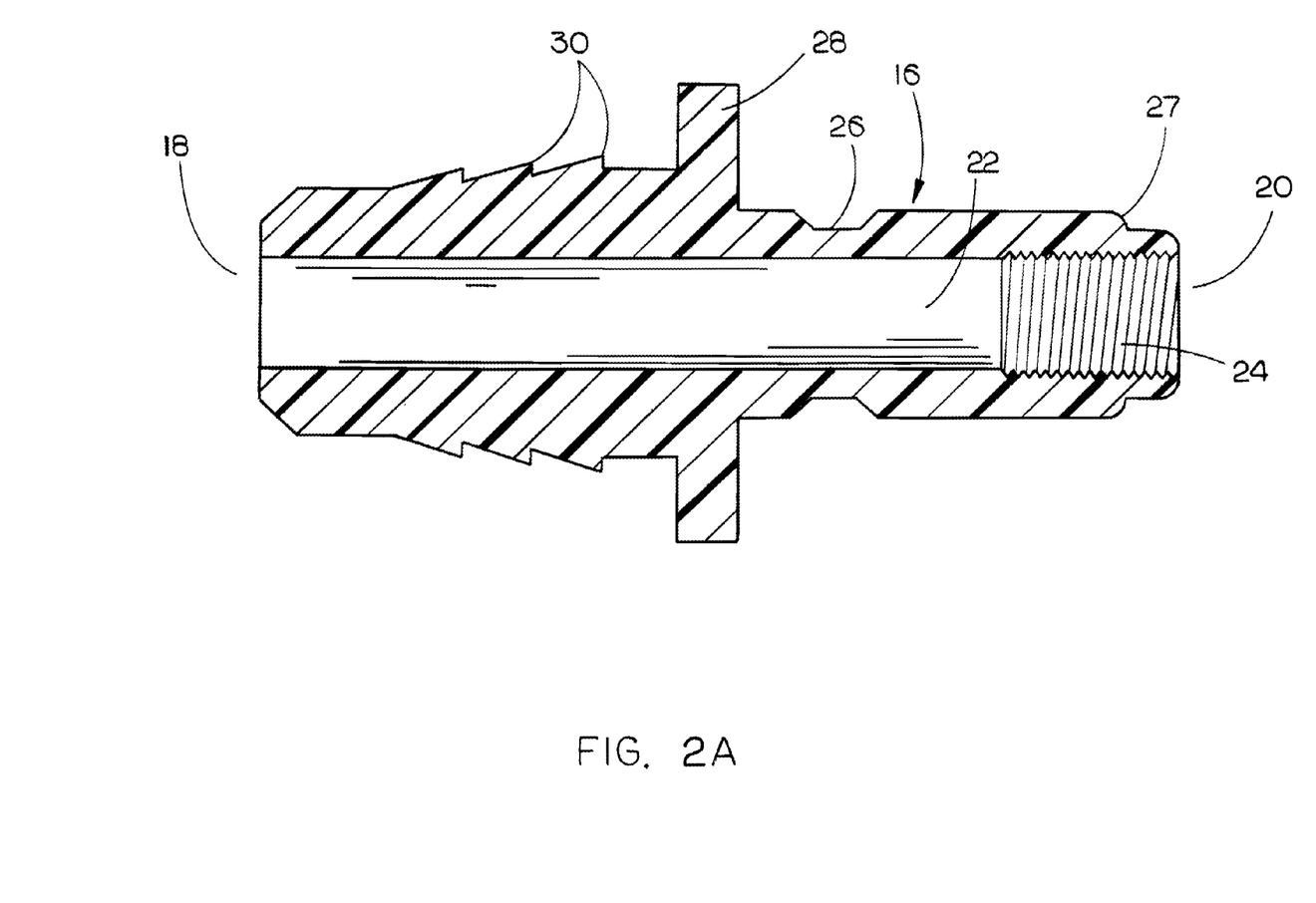
FIG. 2A is a sectional view of the body portion of one embodiment of the tree injection plug of this invention.
Figure 2B:
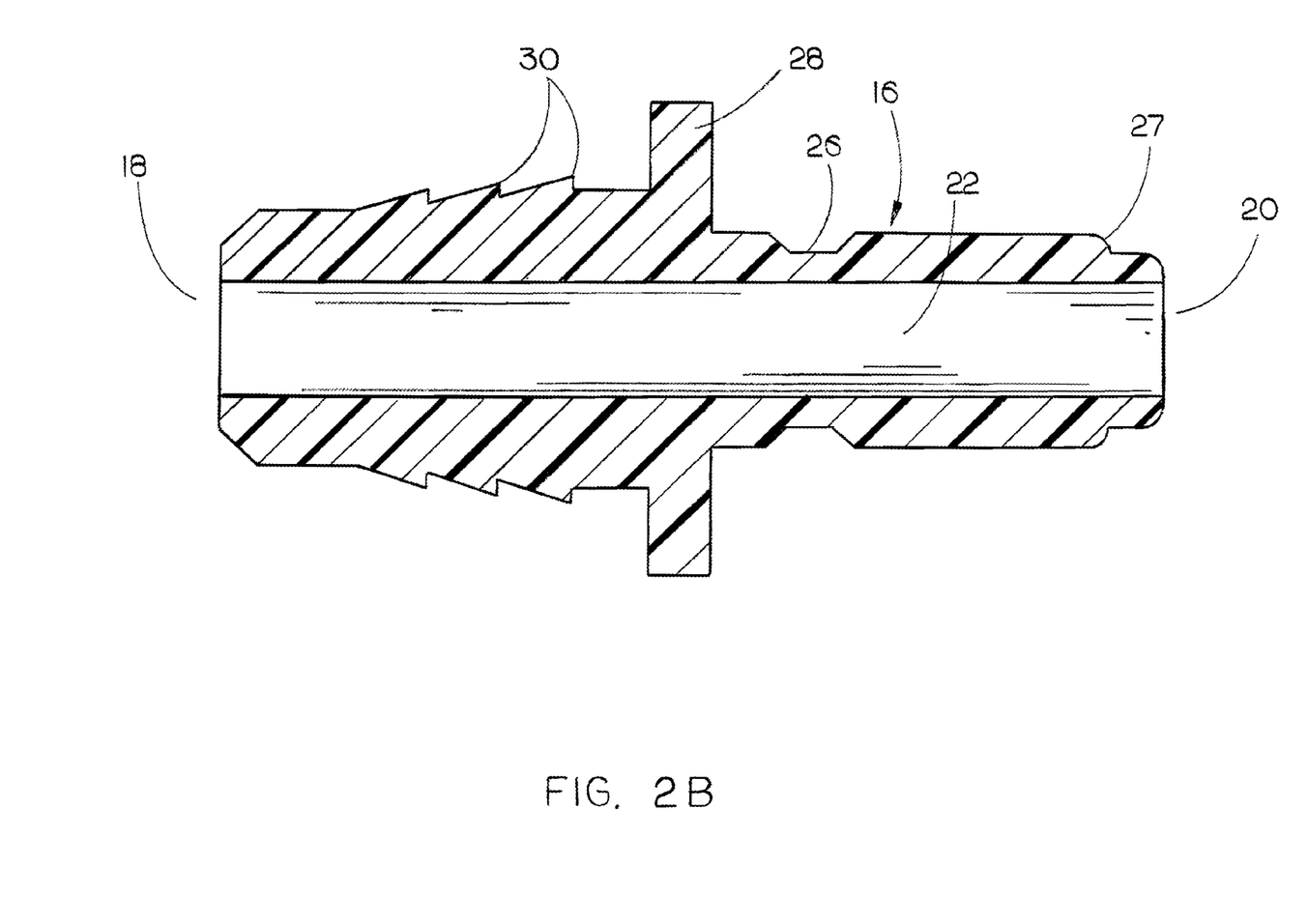
FIG. 2B is a sectional view of a second embodiment of the tree injection plug of this invention.
Figure 5:
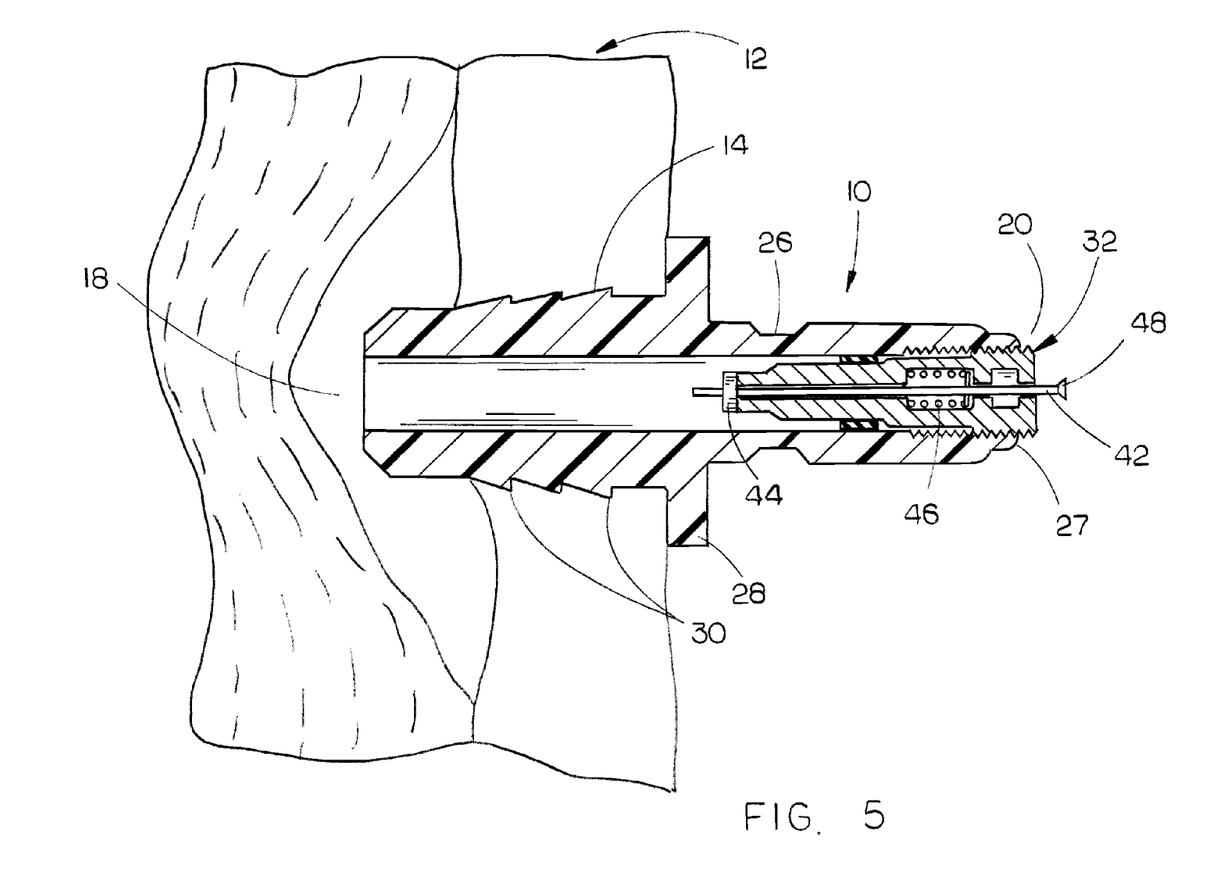
FIG. 5 is a sectional view illustrating the injection plug of this invention positioned in the hole of the tree trunk after the chemical injector has been disconnected from the injection plug.

The numeral 10 refers to the tree injection plug of this invention. The numeral 12 refers to a tree having a hole or bore 14 formed therein by drilling or other suitable means. Plug 10 includes an elongated body portion 16 having a forward end 18 and a rearward end 20. Body portion 16 is preferably comprised of a plastic material but could be comprised of brass, aluminum, etc. Body portion 16 has an elongated fluid passageway 22 formed therein which extends between the rearward and forward ends of body portion 16. In the embodiment of FIGS. 2A and 5, the rearward end of passageway 22 has an internally threaded portion 24. In the embodiment of FIG. 2B, the threaded portion 24 is omitted. Body portion 16 has an annular groove 26 formed therein which functions as a part of a male coupler structure. Body portion 16 also has an annular shoulder 27 which also functions as a part of the male coupler structure at the rearward end of body portion 16. Body portion 16 also has an annular flange 28 which extends therefrom. At least one, and preferably a plurality of annular barbs 30 are provided on the body portion 16 at the forward end thereof.

The numeral 32 refers to a conventional valve core having a rearward end 34 and a formed end 36. Valve core 32 has exterior threads 38 which are adapted to be threadably coupled to threaded portion 24 of body portion 16 when valve core 32 is inserted into fluid passageway 22 of body portion 16. The embodiment of FIG. 2A will be utilized when the body portion 16 is comprised of a metal material such as brass or aluminum. If body portion 16 is comprised of plastic, the threaded portion 24 of body portion 16 is not necessary since the threads 38 of valve core 32 will tend to thread into the plastic material. Valve core 32 includes an elongated fluid passageway 40 which extends between the rearward and forward ends of valve core 32. An elongated valve actuator rod 42 is movably mounted in passageway 40 between open and closed positions. Valve 44 is mounted on the forward end of rod 42 and seals the forward end of passageway 40 when the valve actuator rod 42 is in its closed position. Spring 46 yieldably urges rod 42 and valve 44 to the closed position. The rearward end 48 of actuator rod 42 is positioned rearwardly of the rearward end of valve core 32 when valve 44 is closed.

Figure 3:
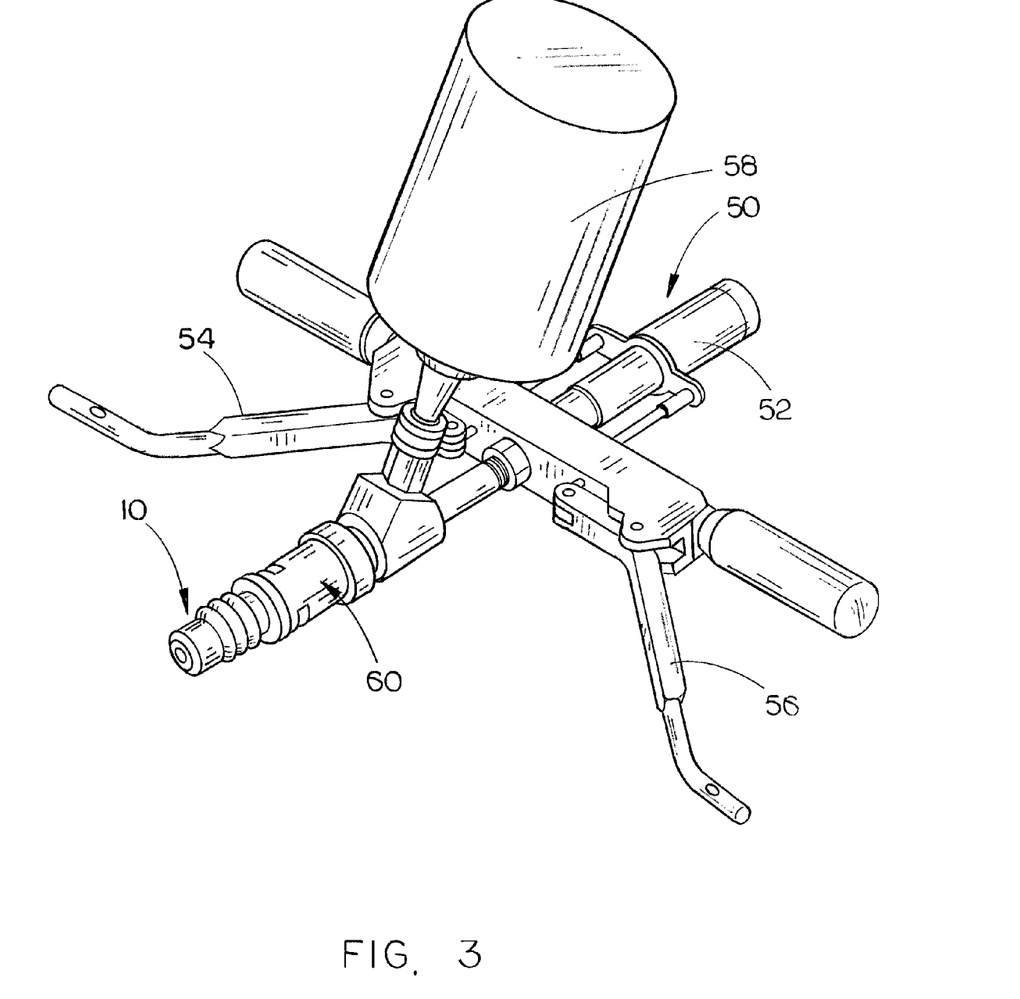
FIG. 3 is a perspective view of the tree injection plug of this invention mounted on the forward end of a chemical injector.

The numeral 50 refers to a chemical injector such as disclosed in pending patent application Ser. No. 13/136,906 entitled AN INJECTION TIP FOR USE WITH AN INJECTOR FOR INJECTING LIQUID CHEMICAL INTO A TREE, or any other chemical injector, the disclosure of which is incorporated herein by reference to complete this disclosure if necessary. Chemical injector 50 includes a hand-operated pump 52 which is operated by a pair of pivotal handles 54 and 56. The numeral 58 refers to a source of liquid chemical. Injector 50 includes a female quick coupler structure 60 at its forward end. When coupler structure 60 is connected to the injector plug 10, valve 44 remains closed.

Figure 4:
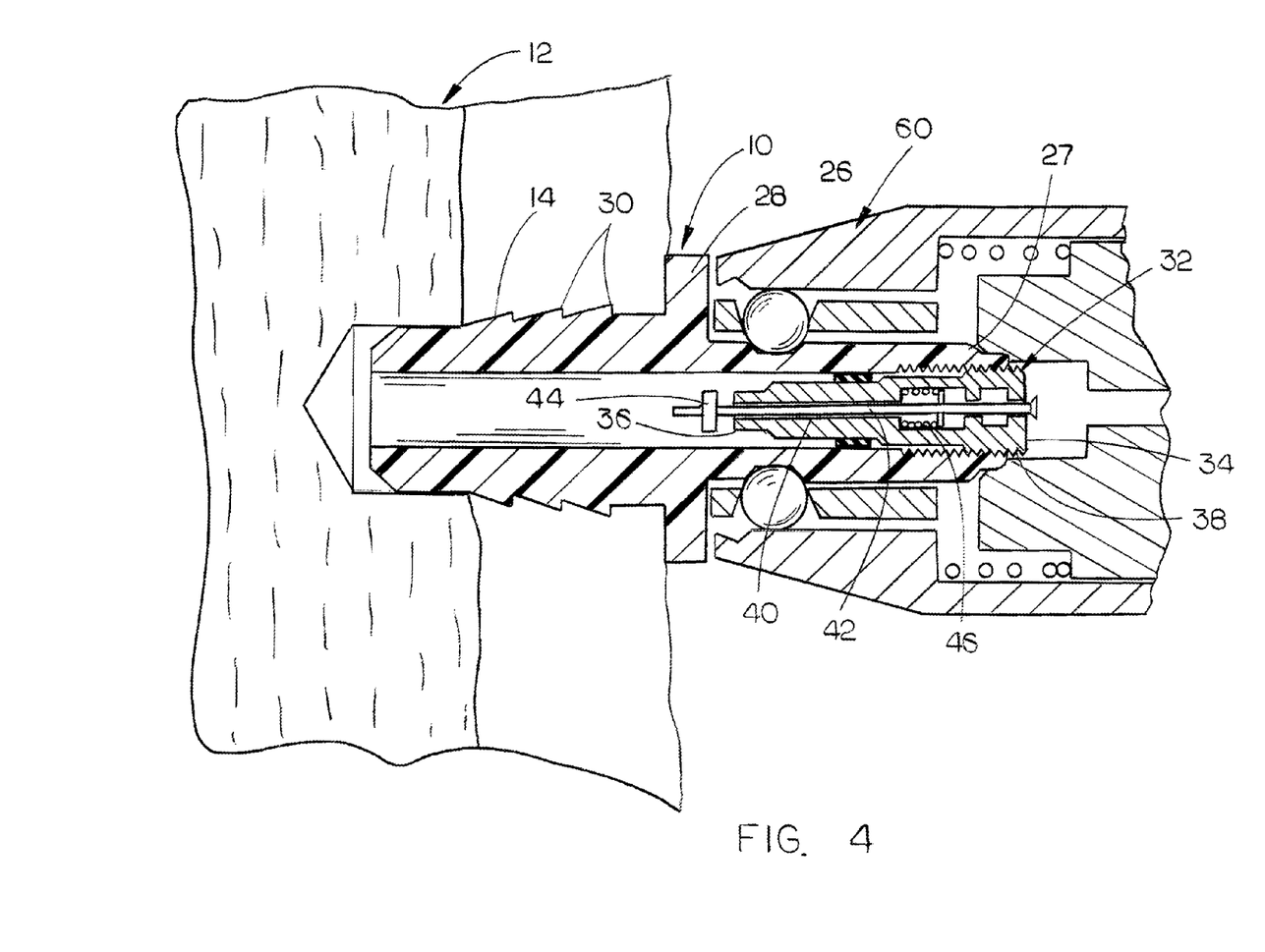
FIG. 4 is a partial sectional view of the tree injection plug of this invention positioned in a hole formed in the trunk of the tree with the valve of the valve core being in an open position.

The tree is injected as follows. A hole 14 is drilled into the tree 12 and which preferably has a diameter of approximately three-eighths inch but could be larger or smaller. The injection plug 10 is then attached to the injector 50 by inserting the rearward end of the injection plug 10 into the quick coupler 60 of the injector 50. When the injection plug 10 is connected to the injector 50, the valve 44 will remain closed. The injection plug 10 is then inserted into the hole 14 in the tree 12 as illustrated in FIG. 4. The injector 50 is then operated to force liquid chemicals into and through the injection plug 10 and into the tree. The fluid pressure of the liquid chemical being ejected from injector 50 will cause valve 44 to open. When a sufficient amount of liquid chemical has been injected into the tree 12, the injector 50 is deactivated which causes valve 44 to close thereby maintaining the liquid chemical in the tree. The female coupler structure 60 of the injector 50 is then disconnected from the injection plug 10 with the injection plug 10 remaining in the tree as illustrated in FIG. 5.

Normally, a plurality of holes 14 will be drilled into the tree or otherwise formed in the tree around the circumference of the tree with the injection plugs 10 remaining in those holes after the injector 50 has been disconnected therefrom.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A tree injection plug for insertion into a hole formed in the trunk of the tree, comprising:
    an elongated body portion having rearward and forward ends;
    said body portion having a fluid passageway therein, having first and second ends, which extends between said rearward and forward ends of said body portion;
    an elongated, spring-loaded valve core, having rearward and forward ends, positioned in said rearward end of said fluid passageway;
    said valve core including a valve which is movable between a normally closed position and an open position;
    said valve, when in said closed position, preventing the passage of fluid through said fluid passageway;
    said valve, when in said open position, permitting the passage of fluid through said fluid passageway;
    an elongated, selectively movable valve actuator having rearward and forward ends;
    said forward end of said valve actuator being connect to said valve;
    said rearward end of said valve actuator being positioned at said rearward end of said body portion;
    said body portion having male coupler structure adjacent said rearward end of body portion which is configured to be coupled to a female coupler structure on a liquid chemical injector to enable liquid chemical to be forced through said valve core and said body portion with the fluid pressure of the liquid chemical causing said valve to open;
    and at least one barb on said body portion adjacent said forward end of said body portion for engagement with the tree when the forward end of said body portion is inserted into the hole in the tree.

2. The tree injection plug of claim 1 wherein said body portion has a transversely extending shoulder extending outwardly therefrom between said rearward and forward ends of said body portion.

3. The tree injection plug of claim 1 wherein said body portion is comprised of a plastic material.

4. The tree injection plug of claim 1 wherein said body portion is generally cylindrical in shape.

5. The tree injection plug of claim 4 wherein said forward end of said body portion is sized to plug the hole in the tree trunk.

6. The method of injecting liquid chemical into the trunk of a tree, comprising the steps of:
    (1) forming a hole in the trunk of the tree;
    (2) providing a chemical injector, which is in fluid communication with a source of liquid chemical and which has a female coupler thereon with the female coupler being in fluid communication with the source of liquid chemical;
    (3) providing an injection plug having an elongated body portion with rearward and forward ends, an elongated central fluid passageway extending between the rearward and forward ends of the body portion, a male coupler structure at the rearward end of the body portion for selective coupling to the female coupler, at least one exterior barb adjacent the inner end of the body member, a spring-loaded valve core including a valve, which is movable between open and closed positions, in the rearward end of the central fluid passageway and which has a valve actuator, having forward and rearward ends, connected to the valve;
    (4) coupling the female coupler onto the male coupler structure on the body portion;
    (5) pushing the forward end of the injection plug into the hole in the tree;
    (6) operating the injector to force liquid chemical through the injection plug into the tree; and
    (7) disconnecting the female coupler from the male coupler structure on the body portion of the injection plug so that the injection plug remains in the hole and seals the same to prevent the liquid chemical from escaping from the hole.

7. A tree injection plug for insertion into a hole formed in a tree, comprising:
    an elongated body portion having rearward and forward ends;

said body portion having a fluid passageway therein, having first and second ends, which extends between said rearward and forward ends of said body portion;

an elongated, spring-loaded valve core, having rearward and forward ends, positioned in said rearward end of said fluid passageway;

said valve core including a valve which is movable between a normally closed position and an open position;

said valve, when in said closed position, preventing the passage of fluid through said fluid passageway;

said valve, when in said open position, permitting the passage of fluid through said fluid passageway;

and at least one barb on said body portion adjacent said forward end of said body portion for engagement with the tree when the forward end of said body portion is inserted into the hole in the tree.

8. The tree injection plug of claim 7 wherein said body portion has a transversely extending shoulder extending outwardly therefrom between said rearward and forward ends of said body portion.

9. The tree injection plug of claim 7 wherein said forward end of said body portion is sized to plug the hole in the tree.

\* \* \* \* \*